United States Patent [19]
Longley et al.

[11] 3,869,508
[45] Mar. 4, 1975

[54] PROCESS OF PRODUCING ADIPIC ACID

[75] Inventors: Kermit D. Longley, Park Forest; Donald Sprowl, South Holland, both of Ill.

[73] Assignee: Witco Chemical Corporation, New York, N.Y.

[22] Filed: Dec. 13, 1968

[21] Appl. No.: 792,882

[52] U.S. Cl............................ 260/531 R, 260/537 P
[51] Int. Cl........................ C07c 51/18, C07c 55/14
[58] Field of Search ................................ 260/531 R

[56] References Cited
UNITED STATES PATENTS

| | | | |
|---|---|---|---|
| 3,234,271 | 2/1966 | Baker et al. | 260/531 |
| 3,390,174 | 6/1968 | Schulz | 260/531 X |

Primary Examiner—Lorraine A. Weinberger
Assistant Examiner—Richard D. Kelly
Attorney, Agent, or Firm—Wallenstein, Spangenberg, Hattis & Strampel

[57] ABSTRACT

Process of producing adipic acid in accordance with the procedure wherein a mixture of cyclohexanol and cyclohexanone is oxidized with molecular oxygen in a reaction vessel in a $C_2$ to $C_6$ saturated carboxylic acid solvent medium, particularly acetic acid, in the presence of a metal catalyst at a temperature of about 120°–125°F. Such known process is improved by (1) periodically or continuously removing a distinctly minor proportion of the reaction mixture from the reaction vessel, (2) separately heating said removed portion to a substantially higher temperature, for instance, 165°–170°F, in contact with molecular oxygen, and (3) periodically or continuously returning said heated separately removed portion to the main reaction mixture in the reaction vessel without increasing the temperature of the main reaction mixture in the reaction vessel substantially above about 125°F. The additions of the periodically or continuously removed and separately heated distinctly minor portions of the reaction mixture to the main reaction mixture in the reaction vessel serve to maintain the oxidation ratio of the cyclohexanol-cyclohexanone mixture at a high level.

7 Claims, 3 Drawing Figures

Inventors
Kermit D. Longley
Donald Sprowl
By: Wallenstein, Spangenberg, Hattis & Strampel attys.

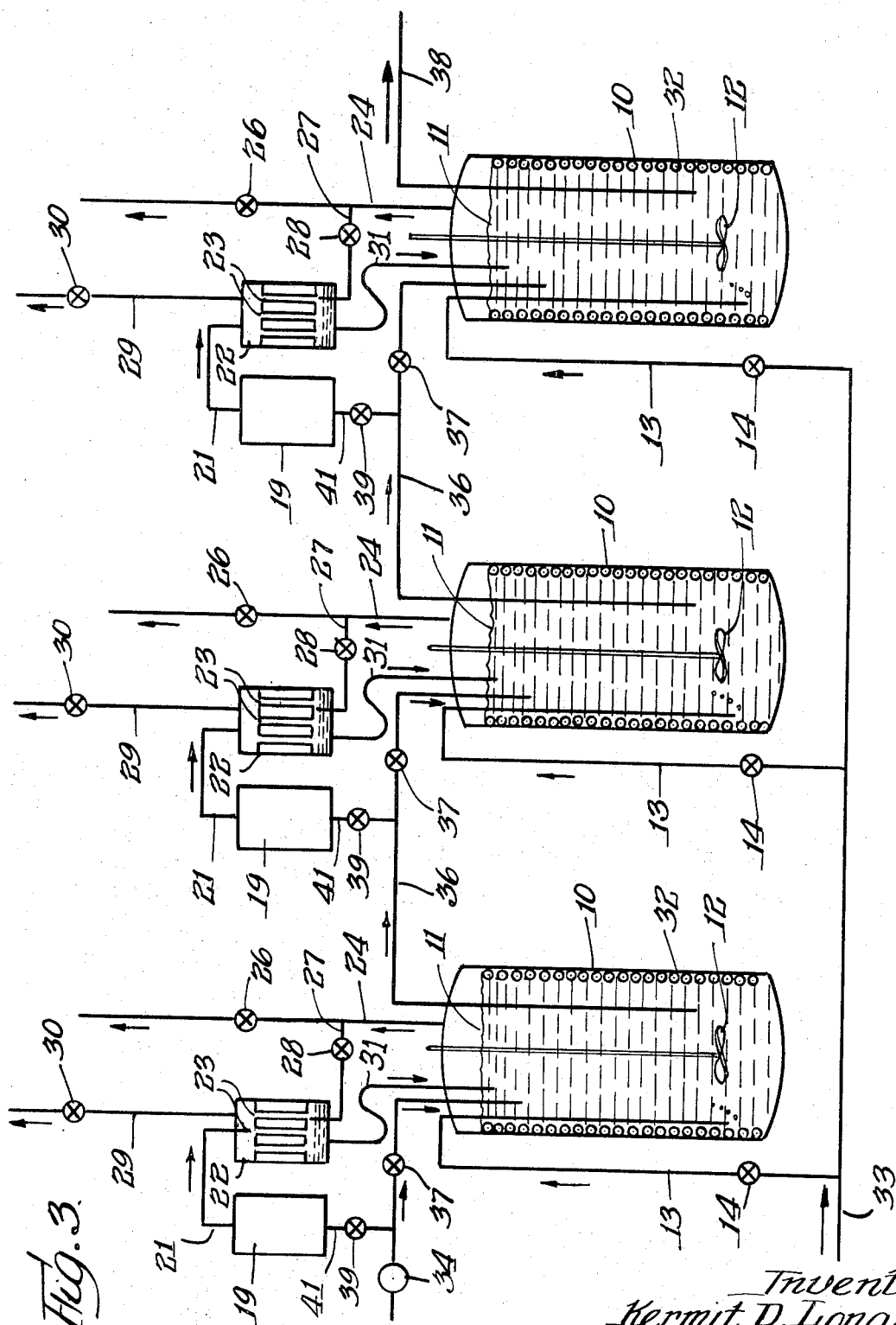

PROCESS OF PRODUCING ADIPIC ACID

Our invention relates to an improved process for producing adipic acid. It relates more particularly to certain improvements in such known types of processes for producing adipic acid wherein a mixture of cyclohexanol and cyclohexanone, produced by oxidizing cyclohexane with molecular oxygen and then removing unreacted cyclohexane and various impurities, is oxidized by molecular oxygen, usually air, in a solvent medium, for instance, glacial acetic acid, in the presence of a catalyst, for instance, manganese acetate and cobalt acetate. The utilization of such solvent media and such catalysts and such processes, generally, are disclosed in U.S. Pat. Nos. 2,005,183; 2,316,543; 2,511,575; and 3,234,271; Petroleum Processing, May, 1956, pp. 74–79; PB-566, Apr. 20, 1948 — Catalytic Oxidation With Atmospheric Oxidation In The Liquid Phase. IV. Oxidation of Cyclohexane — Dr. R. Mittag; and Supplement to Chemical Engineering Science, Vol. 3, 1954, pp. 78 ff — A. F. Lindsay.

In the foregoing type of process, it is known that the oxidation of the cyclohexanol-cyclohexanone mixture by molecular oxygen is desirably carried out at relatively low temperatures, preferably below 150°F, since appreciably better yields of adipic acid are obtained at said lower temperatures. However, the reaction rate is so slow at the lower temperatures as to render the operation uneconomical. Hence, because of such practical considerations, it is known to be advisable to carry out the said oxidation reaction at higher temperatures, for instance, 165° to 170°F, or somewhat higher, in order to obtain satisfactory reaction rates even though yields of adipic acid are reduced.

In accordance with our present invention, it has been discovered that the foregoing type of process can be carried out in such a manner that yields of adipic acid are obtained consonant with low temperature operations while at the same time reaction rates are achieved which are consonant with the higher temperature operations.

Pursuant to our invention, the reaction mixture of cyclohexanol, cyclohexanone, solvent medium and catalyst, is maintained at a low temperature, for instance, and solely by way of illustration, at 120°–125°F, while passing molecular oxygen into contact with said reaction mixture to effect oxidation thereof to produce adipic acid. There is then, periodically or continuously, drawn or removed from the main body of said reaction mixture, a small amount of said reaction mixture which is thereupon heated to a substantially higher temperature, for instance, 165°–170°F, while maintaining said withdrawn amount of the reaction mixture in contact with molecular oxygen. This higher temperature heated small amount of reaction mixture is then periodically or continuously returned to the main body of the reaction mixture without, however, substantially raising the temperature thereof. Thus, by way of illustration, if the main body of reaction mixture comprises, say, 100 gallons, approximately 1 to 3 gallons is drawn off or removed therefrom, heated to about 165°–170°F and contacted with molecular oxygen, and then returned to the main body of the reaction mixture. The temperature of the main body of the reaction mixture can be controlled through cooling coils or the like so that when the said removed or withdrawn portion of the reaction mixture, although at a materially higher temperature than that of the main body of reaction mixture, is returned to said main body of reaction mixture, the temperature of said main body is not substantially increased. Moreover, since the quantity of removed or withdrawn reaction mixture is small in relation to the main body of the reaction mixture, even though the former is at a substantially higher temperature when added or returned to the main body of the reaction mixture, even with cooling or without appreciable cooling, the temperature of the main body of the reaction mixture is not substantially increased by reason of the return of any single quantity of removed or withdrawn and returned amount of higher temperature reaction mixture. However, it is preferred that the main body of the reaction mixture be cooled since the reaction is quite exothermic.

In its broader aspects, the minor portion of reaction mixture need not be drawn or removed from the main reaction mixture in the main reaction vessel. It can be drawn from a separate source, heated to the more elevated temperature, oxygenated and then added to the main reaction mixture and this can be done at irregular or regular intervals. This alternative procedure is, however, from a number of practical considerations, not preferred. Continuous withdrawal of the reaction mixture from the main reaction vessel and continuous return of prior removed minor proportions of reaction mixture, after further heating and oxygenation thereof, to the main reaction vessel represents the particularly advantageous embodiment of our invention.

The mechanism accounting for the results which we obtain pursuant to our invention has not been ascertained. However, it is believed that, at the elevated temperature to which the withdrawn reaction mixture is heated and subjected to molecular oxygen, formation of peroxides and free radicals derived from them occurs which acts to enhance or speed up the rate of reaction or the speed of formation of adipic acid. At any rate, whatever the exact mechanism may be, the fact of improvement of reaction rate while maintaining high yields of adipic acid has been fully demonstrated.

That the invention may even more clearly be understood, there is set forth below a series of tests utilizing an illustrative reaction mixture wherein our invention is not utilized and, also, where our invention is utilized to contrast the results obtained thereby and emphasizing the nature of the improvements which are achieved through the practice of our invention. It will be understood that various other reaction mixtures can be employed in which the proportions of cyclohexanol and cyclohexanone are different, the cyclohexanol exceeding the cyclohexanone in the starting feedstock and, indeed, the feedstock being either essentially cyclohexanol alone or essentially cyclohexanone alone; in which a solvent medium other than glacial acetic acid is employed, and in which other catalysts or metal salt catalysts are employed, as indicated, for instance, in the above-mentioned patents and other printed publications.

The invention will be explained more fully in conjunction with the accompanying drawings in which:

FIG. 3 is another form of a schematic arrangement of apparatus for carrying out our invention.

An illustrative reaction mixture, used in carrying out various of the runs in accordance with the present invention, is one comprising, in terms of parts by weight, the following materials:

|  | Parts |
|---|---|
| Cyclohexanol | 150 |
| Cyclohexanone | 150 |
| Glacial acetic acid | 700 |
| 300 ppm manganese as manganese acetate | |
| 30 ppm cobalt as cobalt acetate | |

The said reaction mixture was placed in a stainless steel autoclave fitted with a turbine type agitator, air inlet and exhaust and the usual auxiliaries for temperature and pressure control. The reaction mixture was heated to and maintained at a temperature of about 123°F and the pressure was adjusted to 150 psig and air flow was started at 3.3 volumes of air per volume of reaction mixture by adjusting the exhaust flow.

Figure 1:
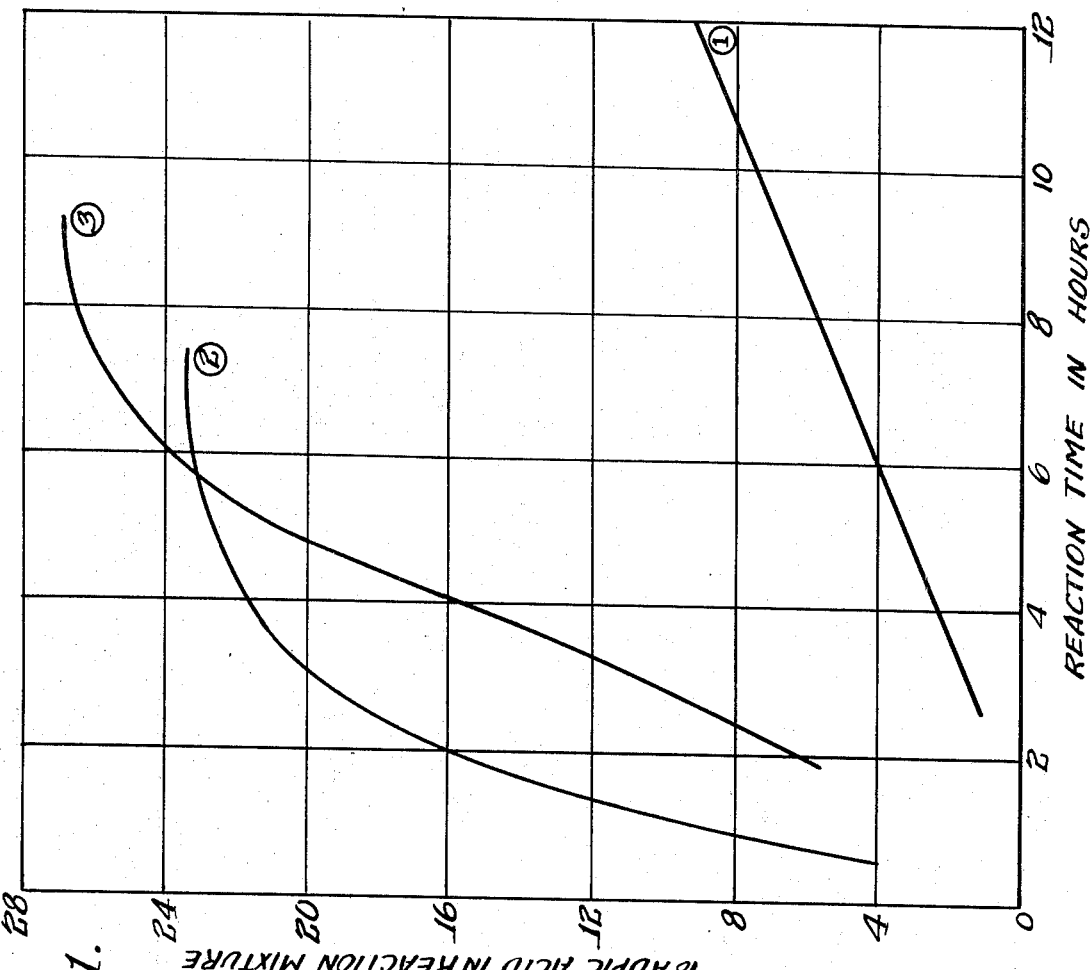
FIG. 1 shows a series of curves dealing with the rate of production of adipic acid in a series of runs wherein our invention has not been utilized and also where our invention has been utilized.

Curve 1 of FIG. 1 shows the reaction rate. At the end of 12 hours, the concentration of adipic acid was about 9.5%. At the end of 17 hours (not extended and not shown in Curve 1), the concentration of adipic acid was about 17% and was still increasing linearly. At this point, the reaction was terminated.

Referring, next, to Curve 2 of FIG. 1, a series of runs was made in which the aforementioned reaction mixture was heated to and maintained at a temperature of about 170°F, all other reaction conditions being the same as in the case of the reaction illustrated in Curve 1. In the reaction shown in Curve 2, which is a mean of a number of such runs, the reaction rate was such that, at the end of 7 hours, the concentration of adipic acid reached about 23.5% at which point the reaction had practically stopped. In neither of the cases of Curves 1 and 2 was our invention utilized.

Figure 2:
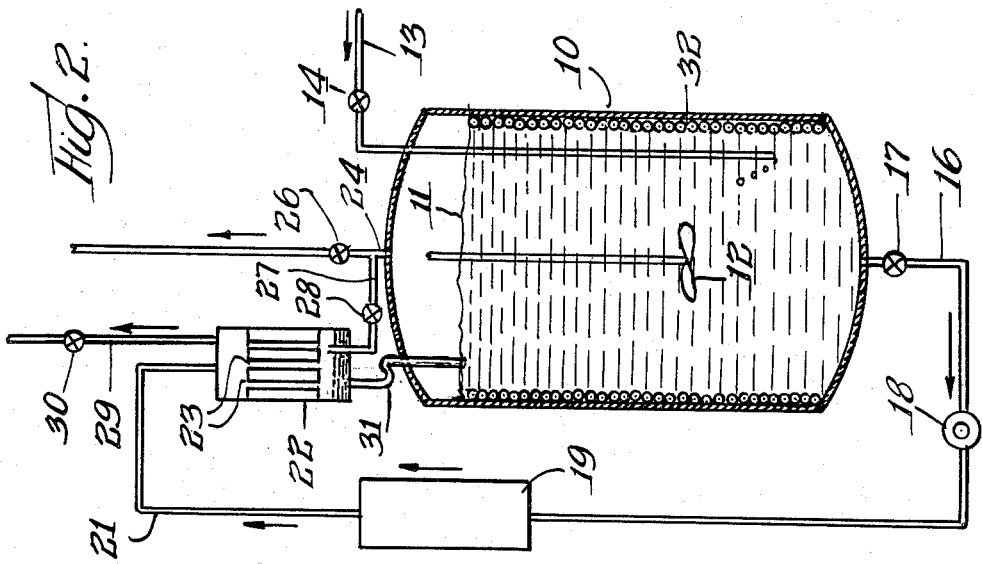
FIG. 2 is one form of a schematic arrangement of apparatus for carrying out our invention.

Referring, now, to FIG. 2, in connection with which our invention was utilized, the aforementioned reaction mixture was placed in the reaction vessel 10 to a height generally indicated by 11, an agitator 12 being provided to stir or agitate the reaction mixture during the reaction. An air inlet pipe 13 is provided with a valve 14 through which air (or other source of molecular oxygen) is pumped at a controlled rate for oxidizing the reaction mixture.

An outlet pipe 16 is connected to the bottom of the reaction vessel 10 and is provided with a valve 17. By means of the pump 18, controlled small quantities of the reaction mixture are pumped through a first heat exchanger 19 to heat the reaction mixture to a temperature substantially above that of the reaction mixture in the reaction vessel 10. On discharge from heat exchanger 19, the heated small quantity of the reaction mixture passes through a pipe 21 into the upper part of a second heat exchanger 22. This second heat exchanger, which serves to maintain the reaction mixture passing therethrough at about the same temperature to which it was heated in the first heat exchanger 19, is provided with a plurality of tubes 23 down the walls of which the reaction mixture moves or trickles in a thin film. As said reaction mixture moves in a thin film down the walls of tubes 23 it is exposed to or subjected to the action of air (or other source of molecular oxygen). This is conveniently accomplished by providing an exhaust air exit pipe 24, having a control valve 26 therein, at the top of the reaction vessel 10, and bleeding off a portion of said exhaust air through pipe 27, having a valve 28 therein, and feeding it into the lower part of heat exchanger 22. Instead of, or in addition to, such exhaust air, fresh or outside air can be introduced into heat exchanger 22. The pipe 27 extends upwardly through the bottom of heat exchanger 22, the top opening of which pipe, in said heat exchanger, is above the level of a small pool of liquid which collects in the bottom of heat exchanger 22. The air, after contact with the thin film of reaction mixture flowing or trickling down the walls of the tubes 23, passes to exhaust through the pipe 29, having a valve 30 therein, leading from the top of heat exchanger 22. The heated oxygenated reaction mixture passes through pipe 31 back into the reaction mixture where it admixes therewith, said pipe 31 extending below the level 11. The reaction vessel 10 is provided with a conventional cooling coil 32 through which cooling water or other cooling fluid is passed to control the temperature of the main body of the reaction mixture in the reaction vessel 10 to a desired relatively low reaction temperature.

In the practice of our invention, utilizing equipment such as is schematically shown in FIG. 2, the reaction vessel 10 was charged with the same illustrative reaction mixture referred to above, the temperature was adjusted to 123°F, and the air flow to 3.3 volumes per volume of reaction mixture. The reaction rate was very slow and little oxygen was absorbed. The heat exchanger pump 18 was then started and flow adjusted so that about 2% of the charge per minute passed through the heat exchangers 19 and 22 and 20% of the effluent air passed through heat exchanger 22. The temperature of this stream was then raised to 150°F by admitting steam to the shell of the heat exchangers 19 and 22 while keeping the main body of the reaction mixture at about 123°F. An immediate increase in oxygen absorption occurred along with simultaneous increase in reaction rate as measured by the amount of cooling water required to maintain the temperature of the reaction mixture. The temperature of the stream passing through the heat exchangers 19 and 22 was then raised to 170°F and a very vigorous reaction ensued. The rate of formation of adipic acid is indicated in Curve 3 of FIG. 1. It will be noted that the rate of adipic acid formation was considerably greater than in Curve 1 and the amount formed was appreciably larger than in Curve 2.

Adipic acid concentrations have been obtained in various runs, pursuant to the practice of our invention, ranging from about 26% (104% on the weight of the cyclohexanol-cyclohexanone in the reaction mixture) at the end of 6 hours, to from 30 to 32% (125 to 130% on the weight of the cyclohexanol-cyclohexanone in the reaction mixture) at the end of 6 hours.

In FIG. 3, there is shown schematically a continuous production system setup in which the equipment of FIG. 2 is connected in cascade, utilizing 3 reaction vessels suitably interconnected through appropriate piping, valves and pumps. Like numerals, where appropriate, are used in FIG. 3 to refer to like elements of FIG. 2. The system of FIG. 3 is provided with a common air source 33 which feeds the air inlet pipes 13 leading into the reaction mixture in each of the reaction vessels 10; a feed pump 34 for feeding the reaction mixture into the reaction vessels 10; conduits or pipes 36, having valves 37 therein, for transferring reaction mixture or product stream from one reaction vessel 10 to another of said reaction vessels, and an outlet conduit or pipe 38 leading from the third or last of said reaction vessels. Valves 39 are appropriately located in pipes 41 which feed into the first heat exchanger 19 in each group of heat exchangers 19 and 22.

In the use of the system of FIG. 3, a reaction mixture or feedstock corresponding to that referred to above was utilized. The addition rate was such that the retention time in the system was about 10 hours.

A run was made at about 123°F without using the by-pass heat exchangers. The equilibrium concentration of adipic acid in the third reactor was about 7%.

A run was made at about 150°F in the same way. The equilibrium concentration of adipic acid in the third reactor was about 20.5%.

A run was made at about 170°F in the same way. The equilibrium concentration of adipic acid in the third reactor was about 22%.

Another run was made at about 123°F. When equilibrium had been attained, about one-third of the feed liquor to each reactor was by-passed through the respective heat exchanger systems, and effluent air was by-passed through each of the three heat exchangers 22 to contact a thin film of the reaction mixture. The temperature of this portion of the feed stream was then raised to about 170°F by means of the heat exchangers 19 and 22. An increase in reaction rate was obtained almost immediately as measured by increased uptake of oxygen and increased cooling water flow required to maintain the desired temperature of about 123°F in the reactor vessels. After equilibrium was attained, the third reactor contained about 26% adipic acid.

It will be understood that the foregoing examples and temperature conditions are illustrative and are not to be construed in any way as limitative of the full scope of our invention. Thus, in regard to the matter of temperatures, the main body of the reaction mixture in the reaction vessel is advantageously maintained in the range of about 100° to about 150°F, particularly at about 120° to 130°F. The removed or withdrawn quantity of reaction mixture is advantageously heated to a temperature at least about 25°F and, better still, from about 30° to 50°F higher than the temperature of the main reaction mixture. Thus, the removed or withdrawn quantity of reaction mixture is desirably heated to a temperature in the range of about 150° to 200°F, preferably 160° to 170°F, before being returned to the main reaction mixture.

We claim:

1. In a process of producing adipic acid by the molecular oxygen oxidation of cyclohexanol or cyclohexanone or mixtures thereof in a $C_2$ to $C_6$ saturated carboxylic acid solvent medium and in the presence of a catalyst, the improvement which consists in carrying out said oxidation in a main reaction vessel at a temperature in the range of about 100° to 150°F, and periodically or continuously adding to said reaction mixture in said main reaction vessel a distinctly minor portion of such a reaction mixture which has been heated to a temperature of at least about 25°F higher than that of the main reaction mixture while in contact with molecular oxygen, while maintaining the temperature of the reaction mixture in said main reaction vessel substantially within said range of 100° to 150°F, the additions of said heated distinctly minor portions of reaction mixture to the reaction mixture in the main reaction vessel serving to maintain the oxidation ratio at a high level.

2. In a process of producing adipic acid by the molecular oxygen oxidation of mixtures of cyclohexanol and cyclohexanone in a glacial acetic acid solvent medium and in the presence of a metal catalyst, the improvement which consists in carrying out said oxidation in a main reaction vessel at a temperature in the range of about 100° to 150°F, periodically or continuously removing a distinctly minor portion of the reaction mixture from the main reaction vessel, separately heating said removed portion of the reaction mixture to a temperature at least about 25°F higher than that of the main reaction mixture while in contact with molecular oxygen, and returning it to the reaction vessel while maintaining the temperature of the reaction mixture in said main reaction vessel substantially within said temperature range of 100° to 150°F, the periodic or continuous additions of said separately heated distinctly minor portions of the reaction mixture to the main reaction mixture in the main reaction vessel serving to maintain the oxidation ratio at a high level.

3. The process of claim 2, wherein the temperature of the main reaction mixture in the main reaction vessel is maintained in the range of about 120° to 130°F.

4. The process of claim 2, wherein the temperature to which the removed minor proportion of the reaction mixture is heated is in the range of about 160° to 170°F.

5. The process of claim 2, wherein the temperature of the main reaction mixture in the main reaction vessel is maintained in the range of about 120° to 130°F, and wherein the temperature to which the removed minor proportion of the reaction mixture is heated is in the range of about 160° to 170°F.

6. The process of claim 2, wherein said removed minor portion of reaction mixture comprises from about 1 to 3% of the volume of reaction mixture in the main reaction vessel.

7. The process of claim 2, wherein the oxygenation of said minor portion of reaction mixture, which is removed from the main reaction vessel and prior to its reintroduction into said main reaction vessel, is effected while said minor portion of said reaction mixture moves downwardly in a trickle or thin film.

* * * * *